Figure 1:
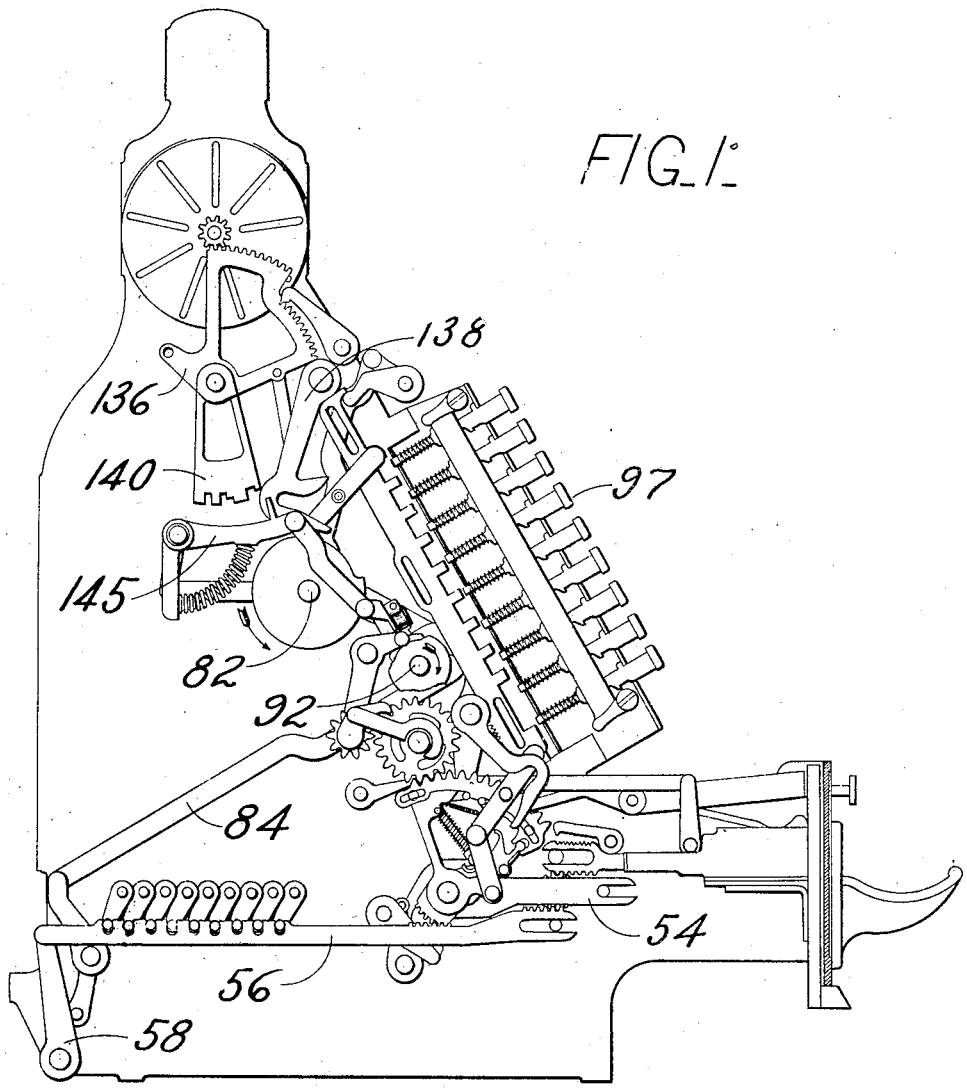

E. S. CHURCH.
CASH AND CREDIT REGISTER.
APPLICATION FILED JULY 5, 1910.

1,182,975.

Patented May 16, 1916.
16 SHEETS—SHEET 1.

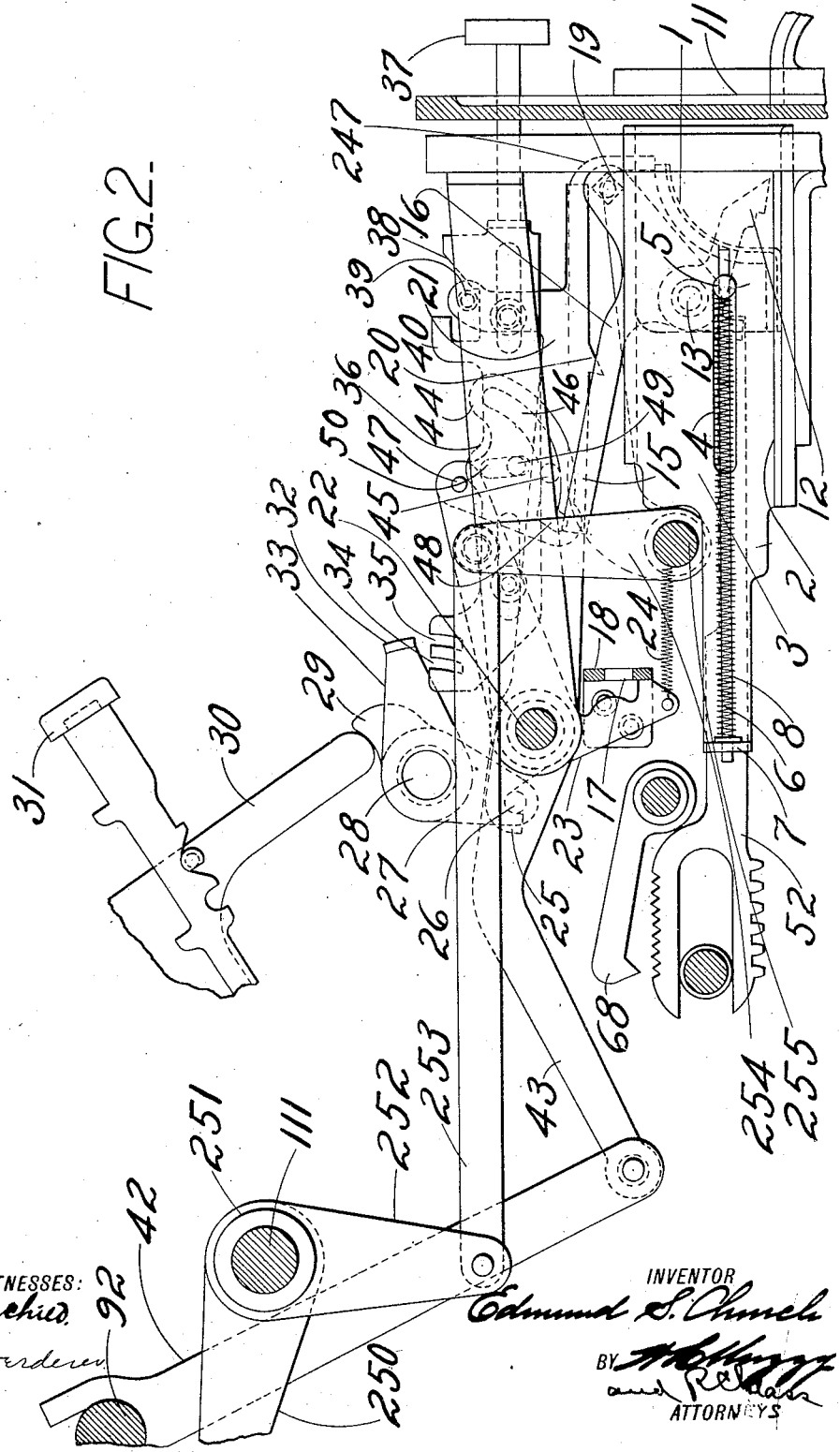

E. S. CHURCH.
CASH AND CREDIT REGISTER.
APPLICATION FILED JULY 5, 1910.
1,182,975.
Patented May 16, 1916.
16 SHEETS—SHEET 3.
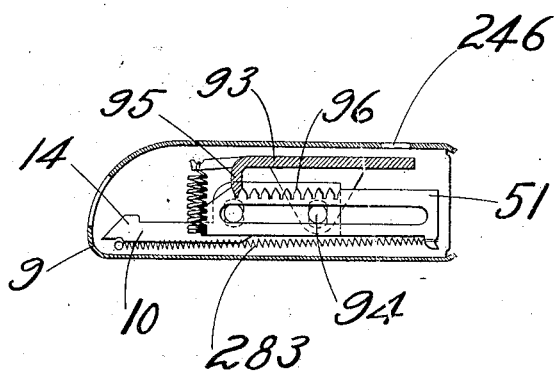
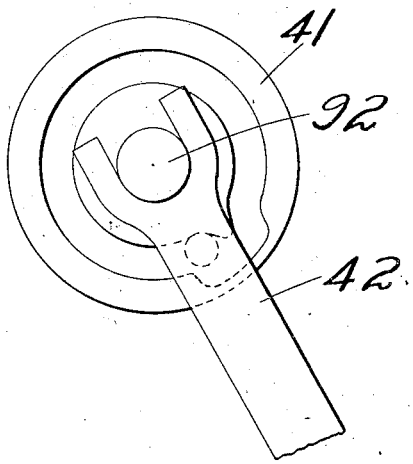
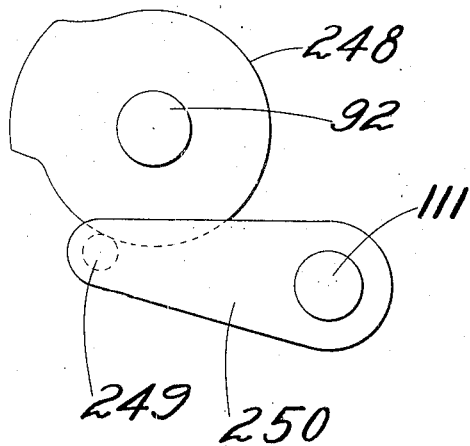
WITNESSES:
INVENTOR
ATTORNEYS

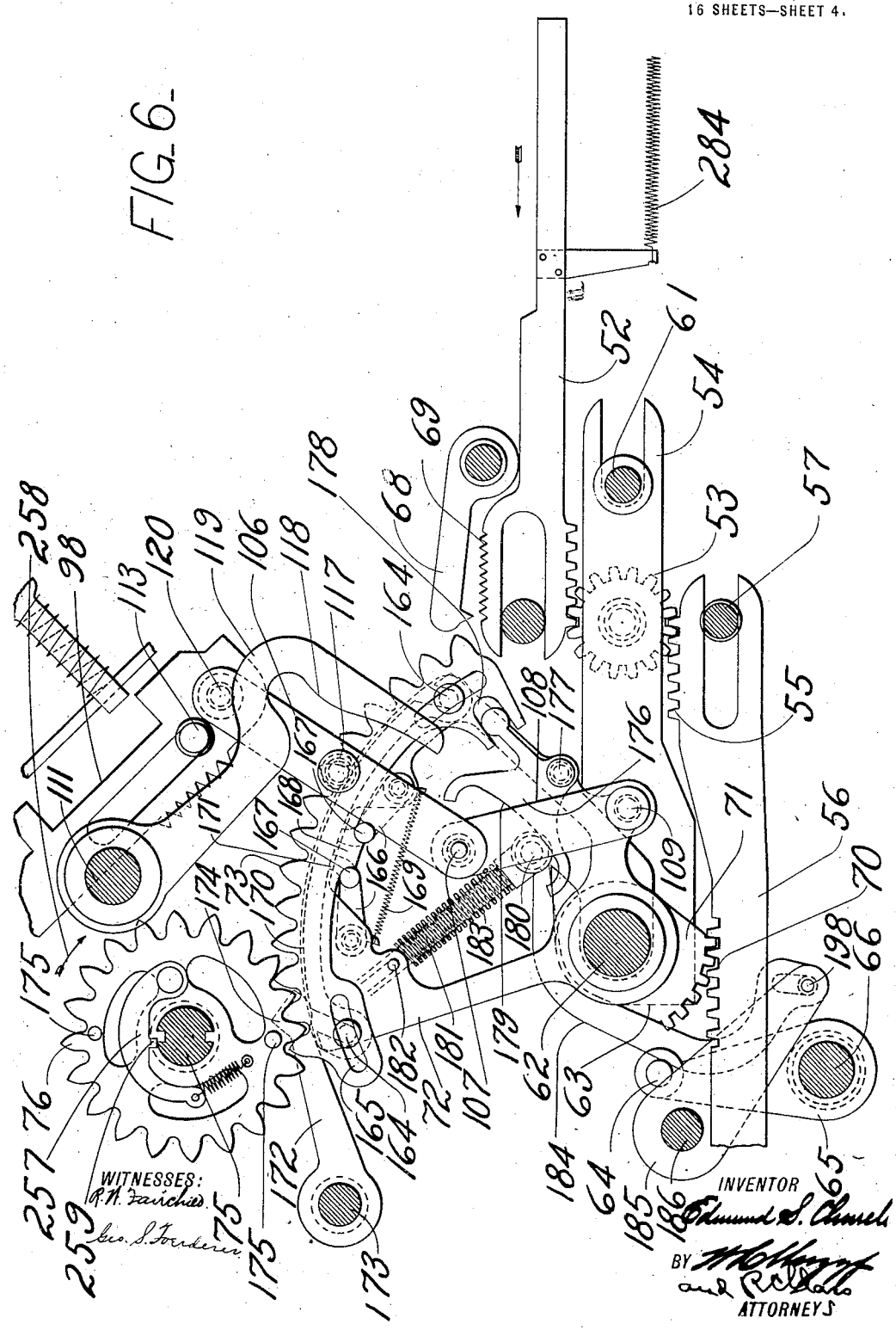

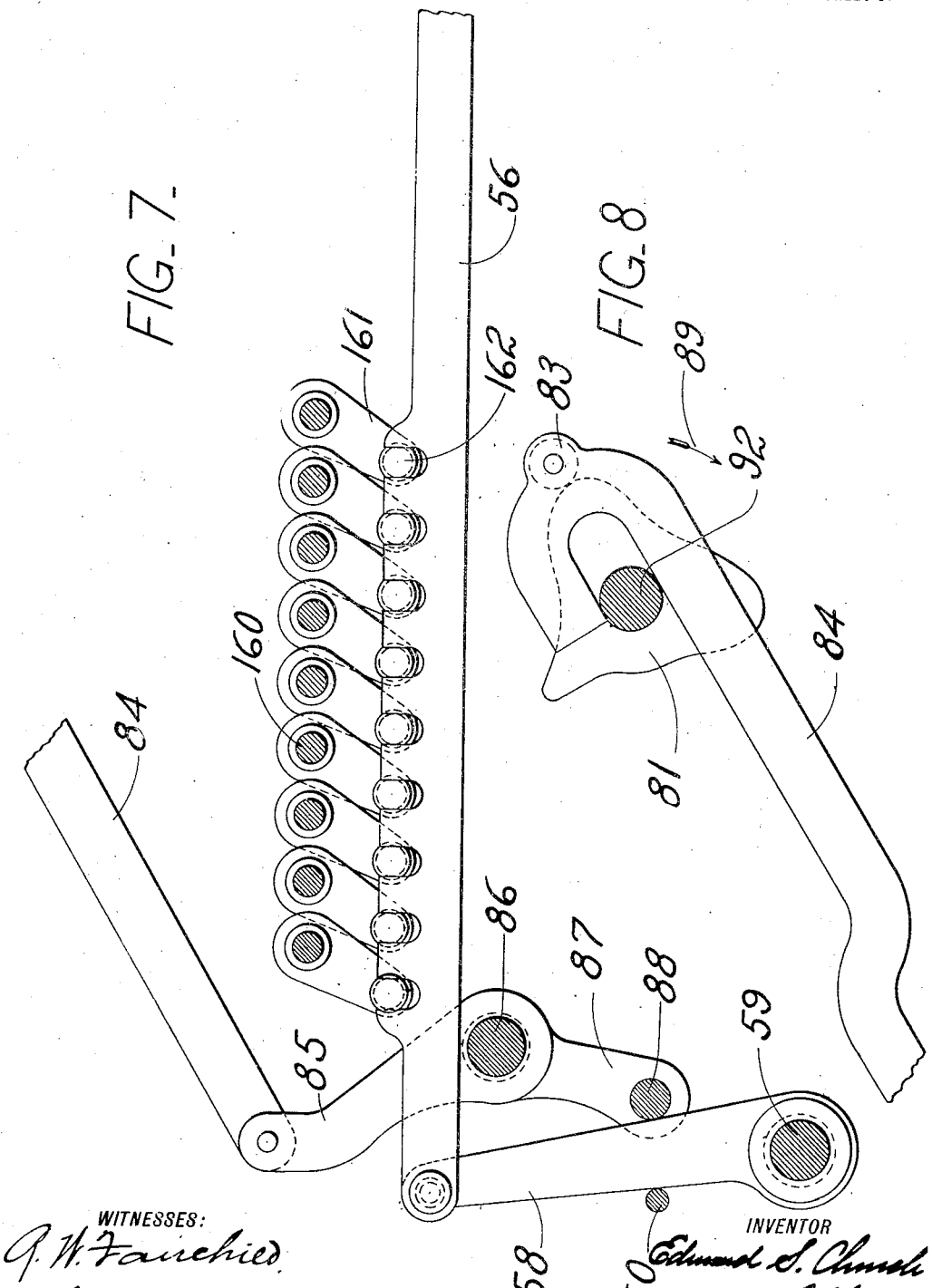

E. S. CHURCH.
ASH AND CREDIT REGISTER.
APPLICATION FILED JULY 5, 1910.
1,182,975.
Patented May 16, 1916.
16 SHEETS—SHEET 6.
FIG. 9.
FIG. 10.
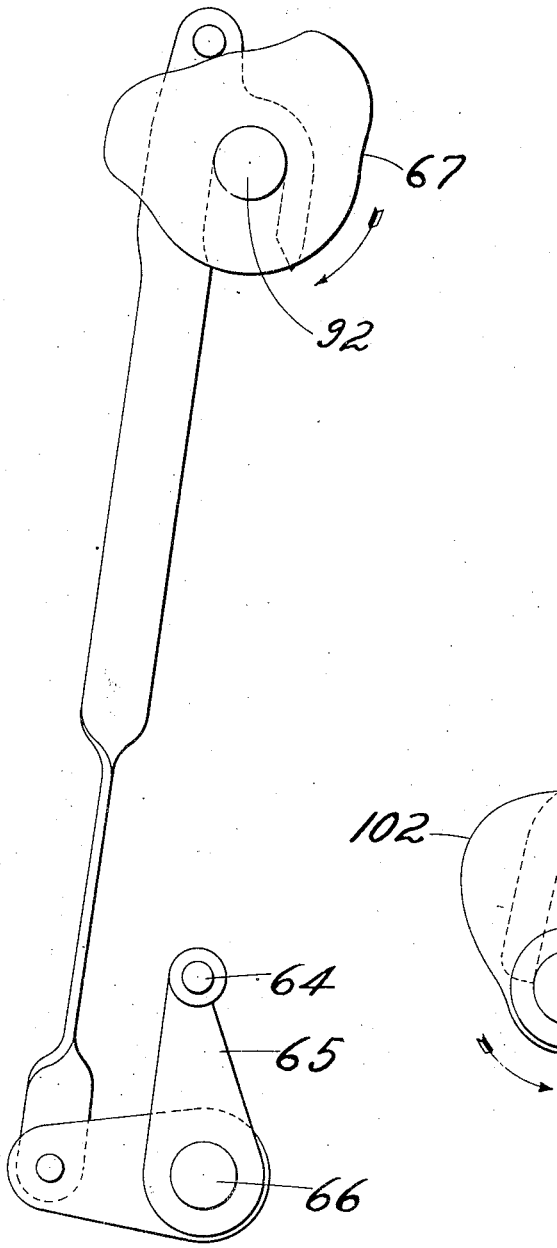
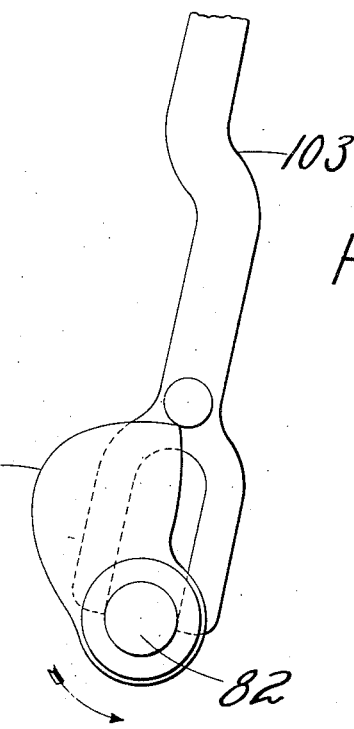
WITNESSES:
INVENTOR
Edmund S. Church
BY
ATTORNEYS

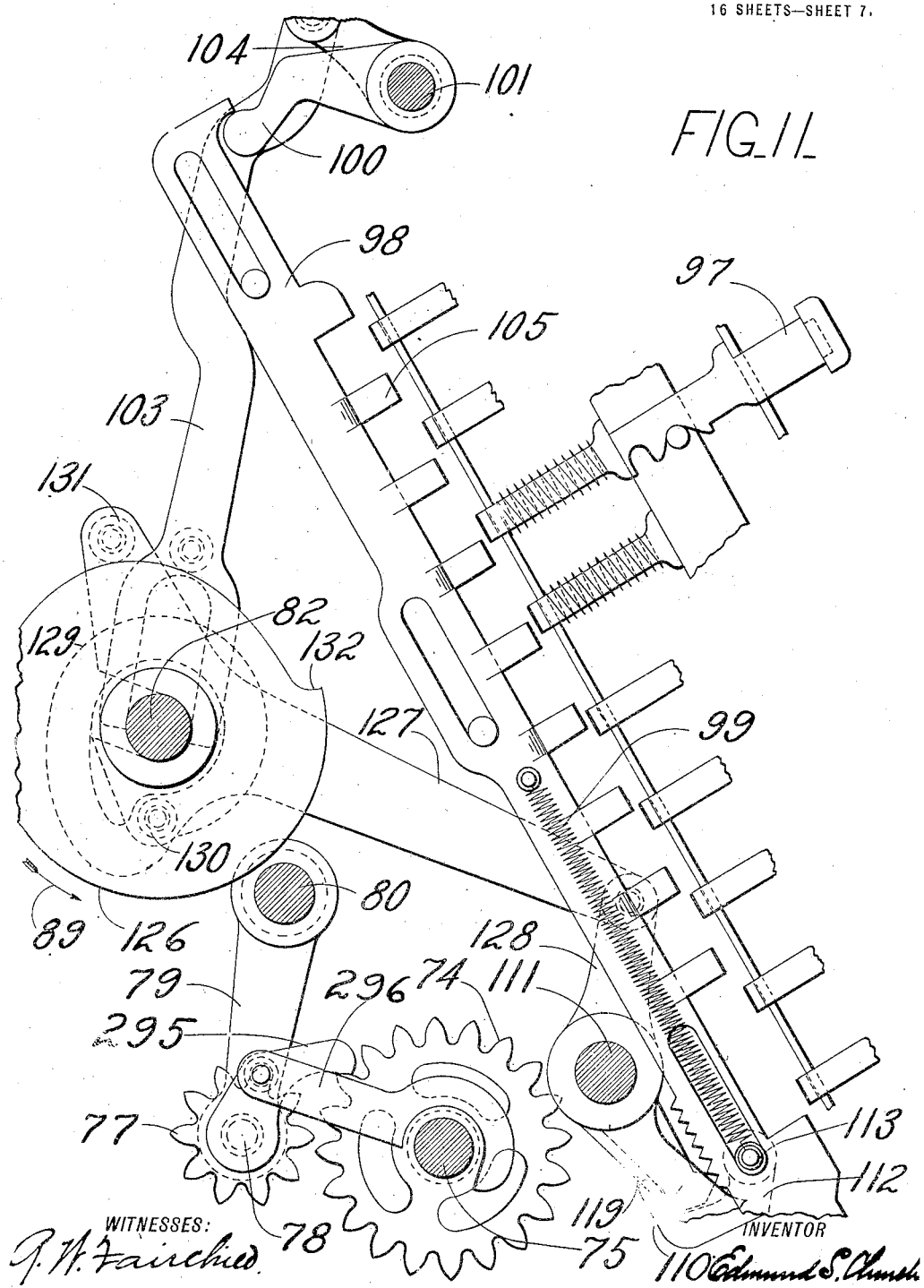

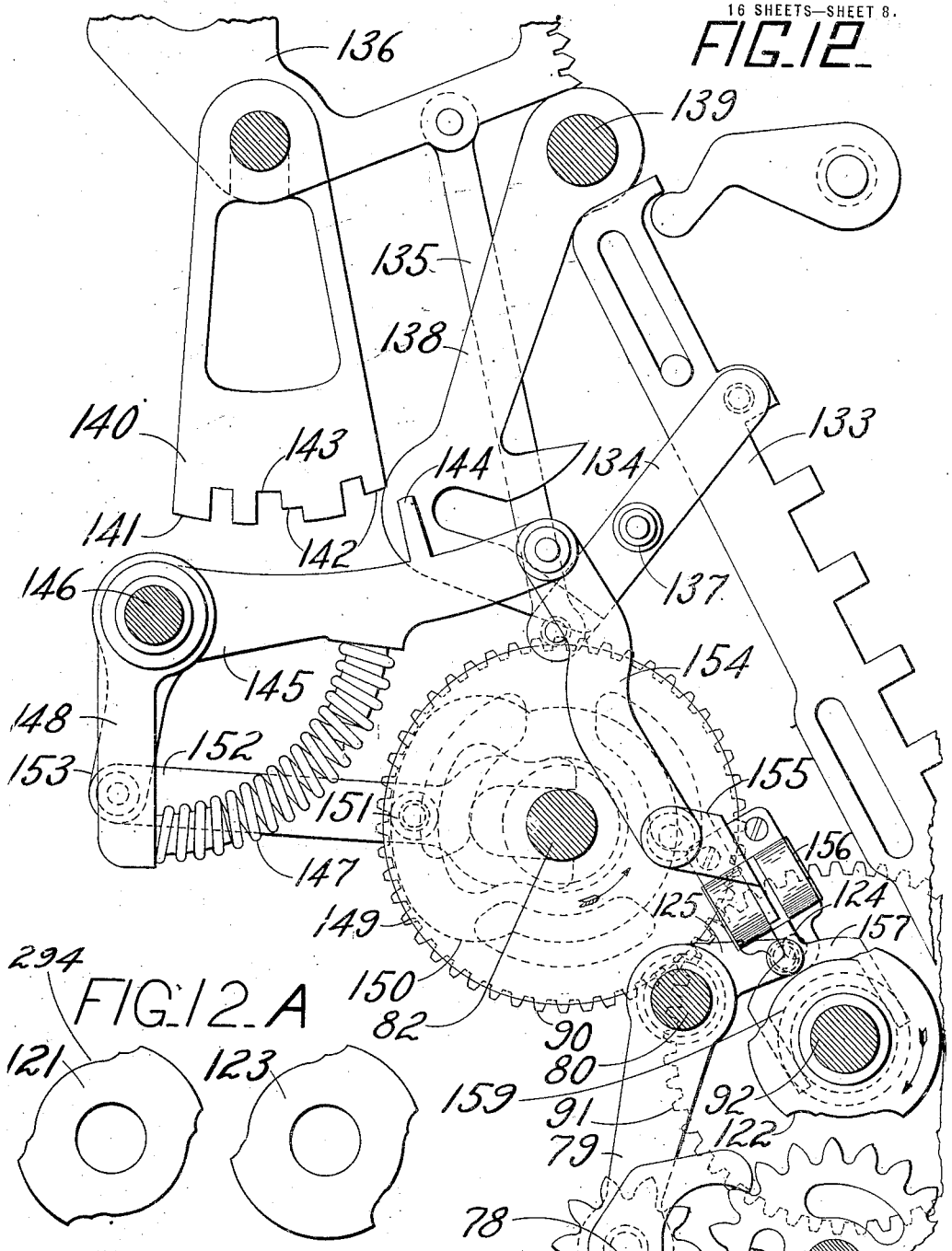

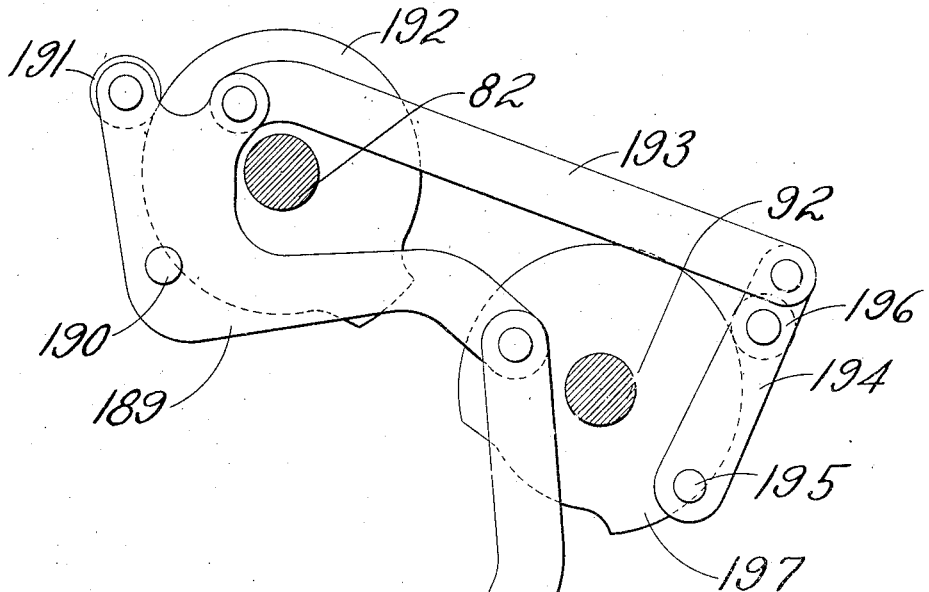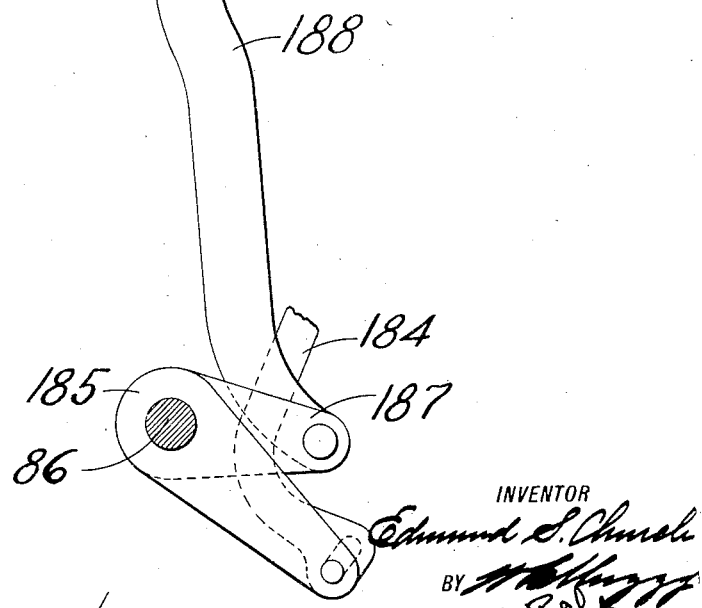

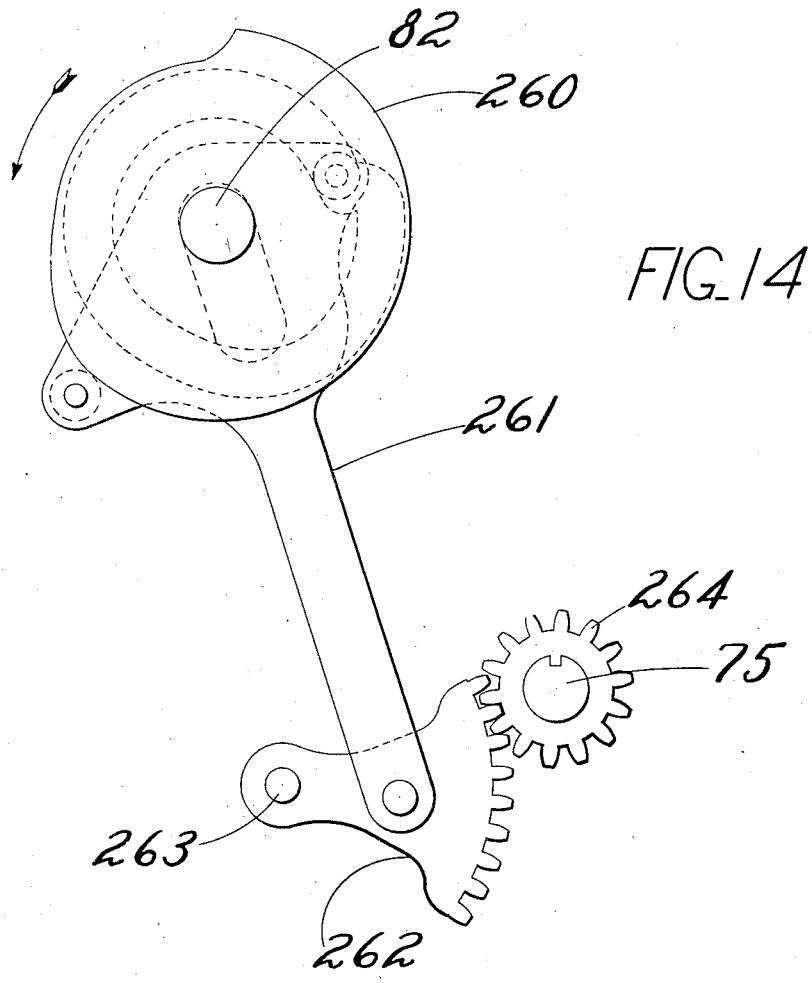
FIG_14

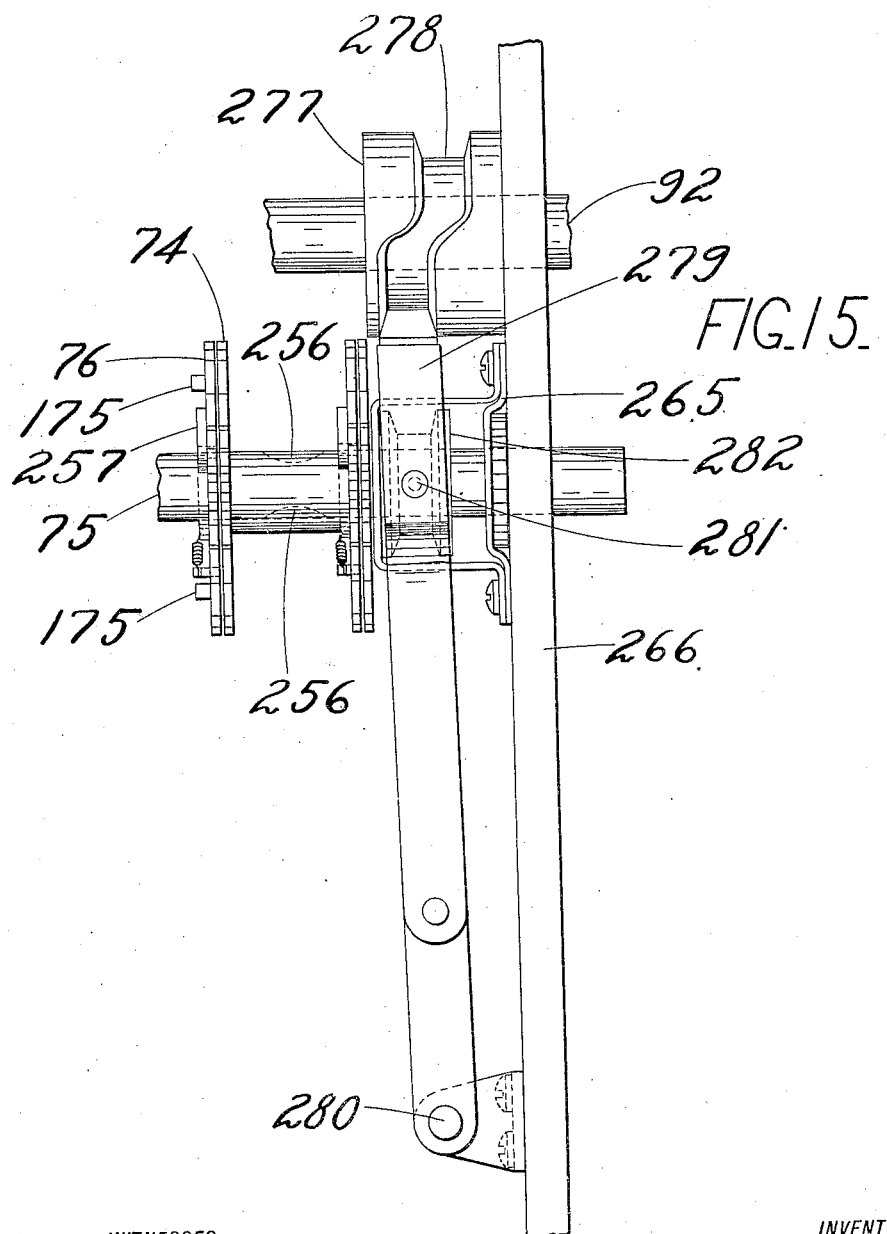

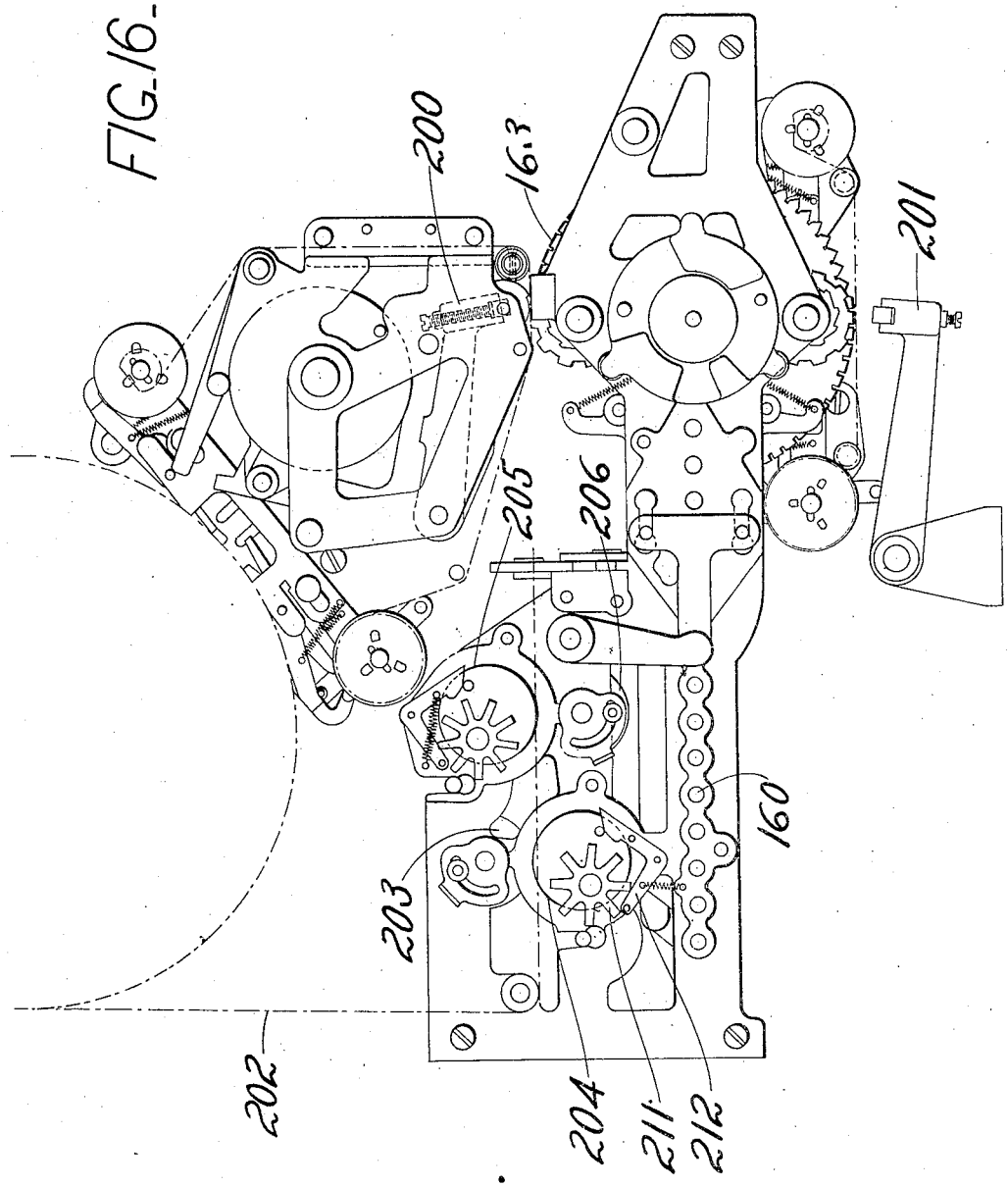

E. S. CHURCH.
CASH AND CREDIT REGISTER.
APPLICATION FILED JULY 5, 1910.
1,182,975.
Patented May 16, 1916.
16 SHEETS—SHEET 13.
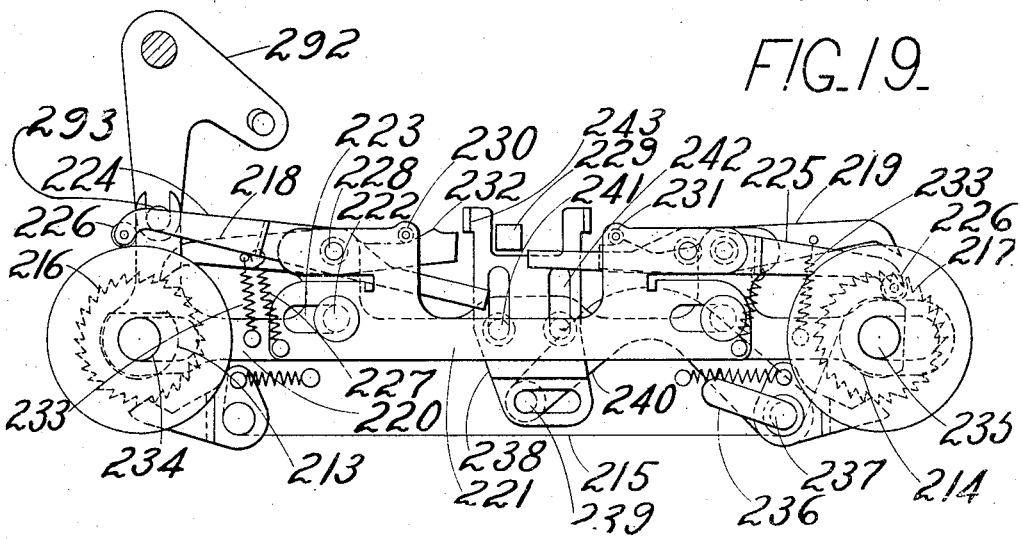
FIG. 19.
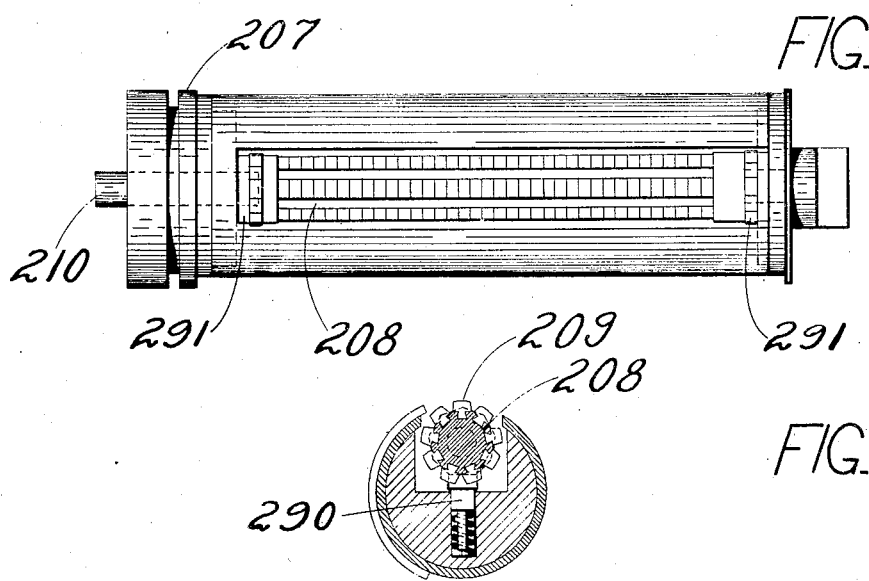
FIG. 18.
FIG. 17.

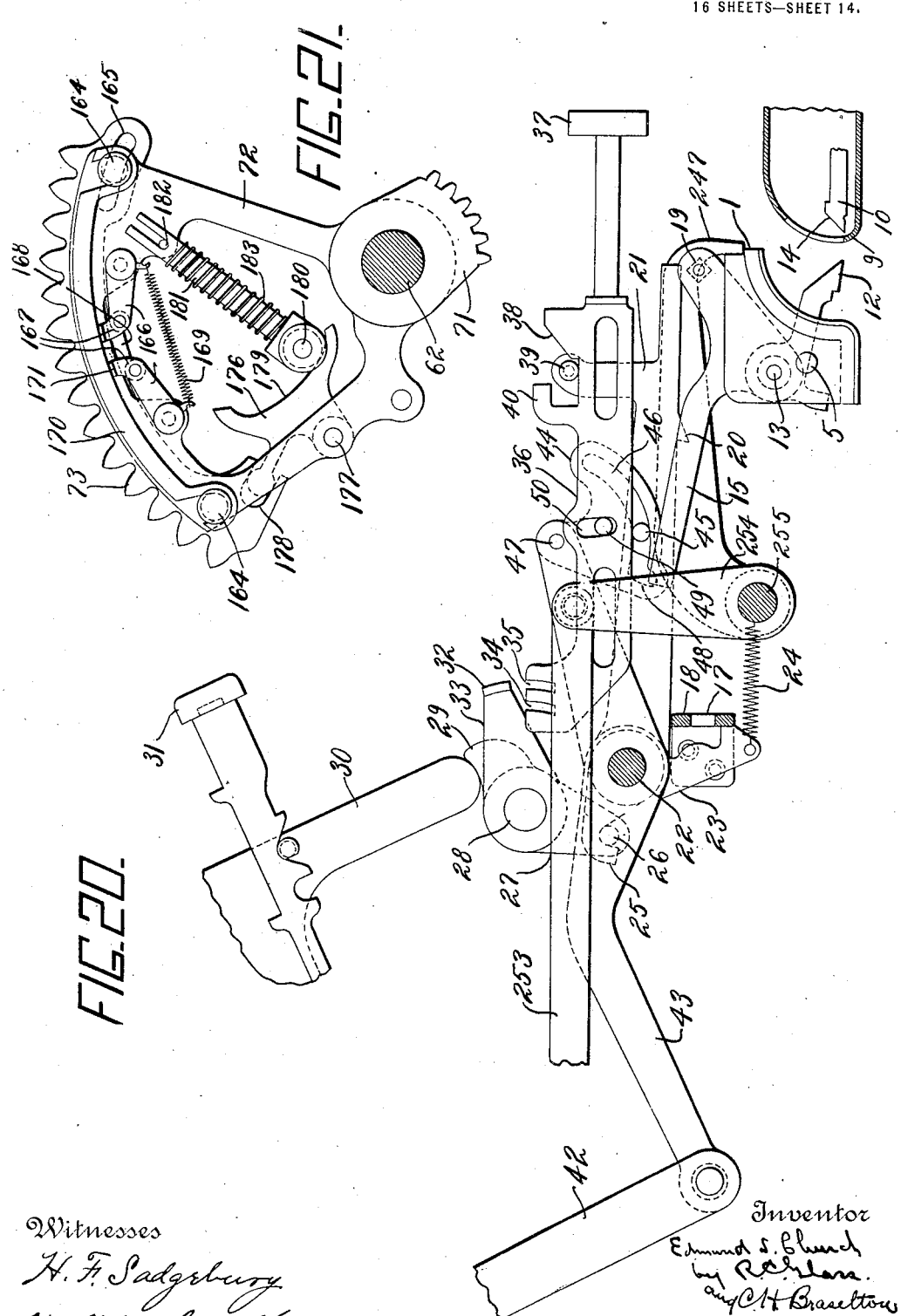

E. S. CHURCH.
CASH AND CREDIT REGISTER.
APPLICATION FILED JULY 5, 1910.

1,182,975.

Patented May 16, 1916.
16 SHEETS—SHEET 15.

Witnesses
H. F. Sadgebury
WM. McCarthy

Inventor
Edmund S. Church
by R. C. Glass
and C. H. Brazelton
Attorneys

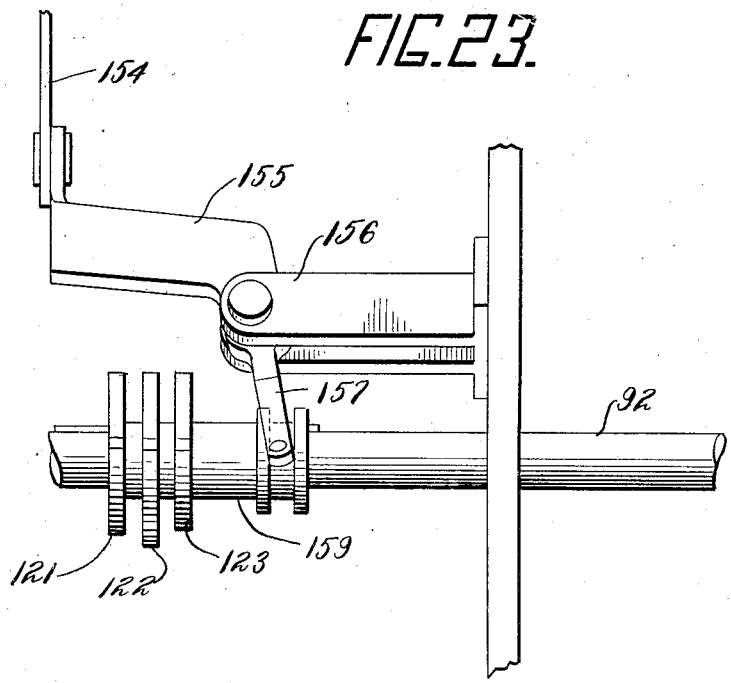
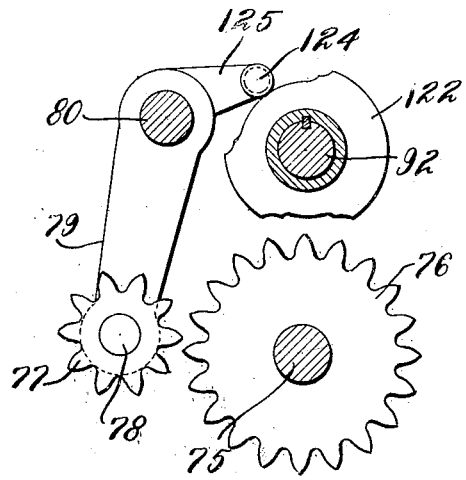
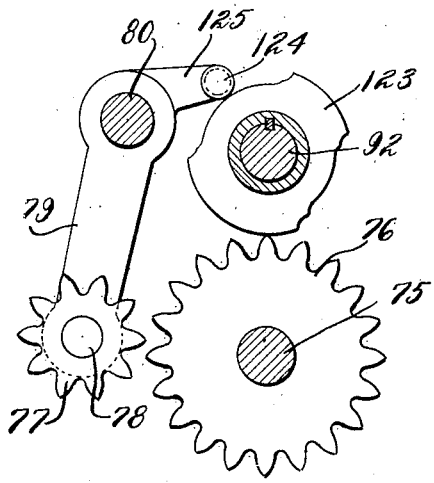

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH AND CREDIT REGISTER.

1,182,975.  Specification of Letters Patent.  Patented May 16, 1916.

Application filed July 5, 1910. Serial No. 570,390.

*To all whom it may concern:*

Be it known that I, EDMUND S. CHURCH, a citizen of the United States, residing at Dayton, in the county of Montgomery and State of Ohio, have invented certain new and useful Improvements in Cash and Credit Registers, of which I declare the following to be a full, clear, and exact description.

This invention relates to cash registers and more particularly to cash registers which are adapted to operate and be operated by detachable accumulating and accounting devices.

Among the objects of the invention are to provide improved means for locking the detachable accounting devices in the register and unlocking and ejecting the same.

Another object of the invention is to provide an improved actuator for totalizing devices, which actuator is capable of an extra unit of movement either in an additive or subtractive sense, for the purpose of carrying transfers from one totalizer pinion to another.

Another object of the invention is to provide an improved cam selecting device whereby different cams may be operatively connected with a totalizer operating mechanism for the purpose of causing a totalizer to be differentially rotated and then returned to its zero position, or to be differentially rotated either in an additive or subtractive sense.

Another object of the invention is to provide an improved means for transmitting differential settings of the detachable accounting devices to totalizing devices of the machine.

Another object of the invention is to provide an improved printing device including a printing cylinder which may be automatically adjusted upon successive operations of the machine to print different matter, such as advertisements, upon checks which are issued by the printing device.

Another object of the invention is to provide improved ink ribbon carrying devices with improved means for reversing the direction of feed of the ink ribbon.

With these and incidental objects in view the invention consists of certain novel features of construction and combinations of parts the essential elements of which are set forth in appended claims and the preferred form of embodiment of which is hereinafter described with reference to the drawings which accompany and form part of the specification.

Figure 22:
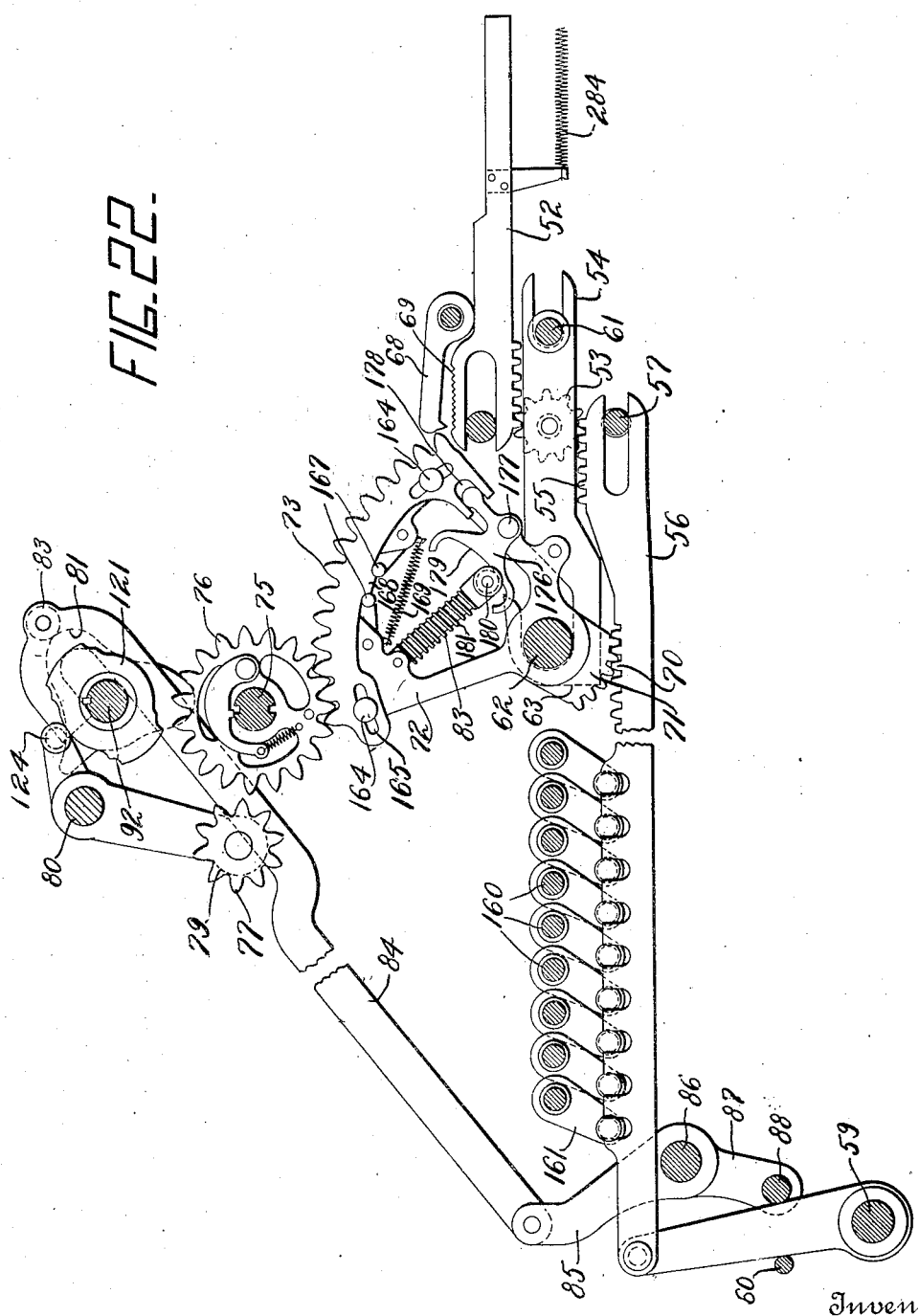

Figure 1 is a transverse vertical section of a cash register constructed according to the invention. Fig. 2 is a detail in side elevation of mechanism for locking and unlocking the detachable accounting devices to the register. Fig. 3 is a sectional view of a detachable accounting device. Fig. 4 is a detail of a cam for releasing the detachable accounting devices from the register. Fig. 5 is a detail of a cam for unlocking the detachable accounting devices. Fig. 6 is a detail in side elevation of certain differential mechanism which is controlled both by the detachable accounting devices and by the keyboard of the register. Fig. 7 is a continuation of Fig. 6. Fig. 8 is a detail of a cam and pitman for operating a restoring device which is shown in Fig. 7. Fig. 9 is a detail in side elevation of an actuating device for part of the differential mechanism. Fig. 10 is a detail of a cam for restoring certain differential slides which are controlled by the keyboard. Fig. 11 is a detail of a bank of keys and coacting mechanism of the register. Fig. 12 is a detail in side elevation of selecting devices which are under the control of a bank of transaction keys and serve to position cams which cause the meshing and unmeshing of subtotalizer pinions at different times. Fig. 12$^A$ is a detail of cams on one of the drive shafts. Fig. 13 is a detail inside elevation of mechanism for restoring the transfer devices. Fig. 14 is a detail of the subtotalizer resetting mechanism. Fig. 15 is a detail of the subtotalizer shaft shifting mechanism. Fig. 16 is a right side elevation of the printing mechanism of the register. Fig. 17 is a transverse vertical section of a printing cylinder. Fig. 18 is a front elevation of a printing cylinder. Fig. 19 is a side elevation of the ink ribbon feeding device. Fig. 20 is a view similar to Fig. 2 with a number of the parts shown in the latter figure left out for the sake of clearness. Fig. 21 is a detail side elevation of one of the subtotalizer actuators and transfer devices carried thereby looking at said actuator in an opposite direction from that in which it is shown in the other views. Fig. 22 is a side elevation of a part of the mechanism employed in transferring an amount from the detachable device to the subtotalizer and from the latter back to the detachable device. Fig. 23 is a front elevation of the devices under the control of the special bank of keys for shifting the cams which determine the time of engagement between the actuators and subtotalizer. Figs. 24 and 25 are detail views of the cams and connections for engaging the actuators and subtotalizer during the adding and subtracting operations respectively.

The cash register of the present invention is of the same class as the register which is described in a copending United States patent application, filed by E. S. Church on Jan. 17, 1910, Serial No. 538,470, for cash and credit register.

The register is adapted to be controlled by and differentially to set detachable accounting devices. These devices comprise a plurality of denominational slides which may be adjusted by the register to represent different amounts and then be locked in their set positions and ejected from the register. A record is thereby preserved in the detachable accounting device which may again be transferred to the cash register by inserting the detachable accounting device in an opening of the register provided for this purpose. When a detachable accounting device is inserted in the register its denomination slides engage coacting slides in the register and thereby differentially position the slides of the register according to the positions of the slides of the datachable accounting device. The register contains a subtotalizer which receives differential rotation from the detachable accounting device and then is further actuated either in an additive or subtractive sense by controlling devices of the register. Means are provided for resetting the subtotalizer and transferring its final setting to the detachable accounting device, which is then ejected from the machine in its newly adjusted condition.

The actuating mechanism for the subtotalizer consists of a plurality of racks which are carried by differentially movable members and which are arranged to move for transferring purposes an extra unit under spring action relatively to their carrying devices, in either an additive or subtractive direction.

*Driving mechanism.*—Having reference to the drawings, power is supplied to the machine through the drive shafts 82 and 92, either by means of a motor or a crank geared to one of these shafts. The shaft 82 carries a gear 90 (Fig. 12) meshing with a gear 91 on shaft 92, therefore these shafts are oppositely rotated, and one each given one complete rotation at each operation of the machine. The direction of rotation is indicated by the arrows.

*Carriage and latching mechanism for detachable accounting devices.*—A carriage 1 for the detachable accounting devices is shown in Fig. 2. This carriage is slidable on a plate 2 and within guide plates 3, provided with horizontally disposed guide slots 4 through which extend pins 5 on the carriage 1. Rods 6 are carried by lugs 7 of the plates 3 and extend through holes in the pins 5. Coiled springs 8 surround the rods 6 and are adapted to be compressed between the lugs 7 and the pins 5 upon inward movement of the carriage 1 for the purpose of returning the carriage at the completion of each operation of the machine.

Upon the insertion of a detachable accounting device it becomes automatically locked to the machine, and unlocks a bank of special keys so that these keys may be manipulated; depression of a special key prevents release of a detachable device during the operation of the machine, though a detachable device may be released and ejected from the machine, if desired, before the depression of a special or transaction key. A manipulative device is provided which may be adjusted to cause the detachable devices to be ejected after each operation of the machine, or may be adjusted so that the detachable devices will not be automatically ejected but may be successively operated by continued operation of the machine. The following description relates to these latching and locking devices: The carriage 1 is moved inwardly manually upon the insertion of a detachable accounting device through engagement with forward end 9 (Fig. 3) of the accounting device. The detachable accounting devices are provided with shouldered blades 10 which, when the accounting devices are inserted in an opening 11 of the register, engage a latch 12 Figs. 2 and 20 on the carriage 1, rocking the latch 12 upwardly around its pivot 13 until a shoulder 14 of the blade 10 passes the shoulder of the latch, when the latch drops downward slightly thus bringing a rearward extension 15 of an arm 16, which is secured to the pivot pin 13, into a horizontal plane with an opening 17 of a bracket 18.

The continued rearward movement of the detachable accounting device and the carriage 1 causes the rearward extension 15 to enter the opening 17 thereby preventing the release of the accounting device from the carriage 1. Further inward movement of the carriage 1 brings a pin 19 on the arm 16 to the rear of a shoulder 20 of a latch 21 which is loosely pivoted upon a shaft 22. The shoulder 20 then engages the pin 19 and prevents the withdrawal of the detachable accounting device. The inward movement of the carriage 1 also causes the extension 15 of the arm 16 to engage an arm 23 which is carried rigidly by the shaft 22 rocking it rearwardly against the action of its spring 24. The shaft 22 also carries a hook 25 which at this time raises clear of a pin 26 carried by an arm 27 fast on a shaft 28. This shaft carries rigidly an arm 29 which extends below a key detent 30 of a bank of special keys 31. Upon the depression of a special key the detent 30 is moved downwardly a slight distance thus causing the shaft 28 to be slightly rocked, but if the hook 25 is not clear of the pin 26 it is impossible to depress a special key as the detent 30 is then prevented from moving downwardly. Because of this arrangement it is impossible to depress a special or transaction key unless a detachable accounting device is properly placed within the machine. The present machine is arranged similarly to other cash registers in respect to its bank of transaction keys, that is, it is impossible to operate the machine until one of the transaction keys is depressed. As machine locks under the control of transaction keys are common to a great many cash registers, one being shown in the application before referred to, a lock of this class is not illustrated in the drawings.

The lowering of the key detent 30 also causes a flange 32 of an arm 33, which is carried rigidly by the shaft 28, to enter one of two notches 34 and 35 in a slide 36 thereby preventing movement of this slide during the time a transaction key is depressed and the machine is operating. The slide 36 controls means for lifting the latch 21 upwardly from its pivot 22 and thus releasing the carriage 1 and permitting the ejection of the detachable accounting device under the action of the springs 8. The slide 36 for this purpose carries a push key 37 extending outside the casing which, when pushed inwardly manually, causes the slide to move inwardly, an inclined edge 38 of the slide at this time engaging a pin 39 on the latch 21 thereby causing the latch to rise and release the carriage 1. But manipulation of the key 37 is prevented by the flange 32 whenever a transaction key is in its depressed position. The key 37 and slide 26 are shown in their normal position in Fig. 2. The key 37 may also be pulled outwardly a slight distance bringing a shoulder 40 on the slide 36 over the pin 39 and the notch 34 of the slide in the path of movement of the flange 32. The slide is then similarly locked upon the depression of a transaction key but when it is in this outer position the shoulder 40 prevents the actuation of the latch 21 and thereby prevents the usual release of the carriage 1 by certain operating mechanism for this latch, which is under the control of the driving mechanism of the register and is arranged normally to release the carriage 1 at the completion of the operation of the machine. Therefore when the key 37 is in its outer position it is not necessary to reinsert a detachable accounting device if it is desired successively to make several registrations in the same; however at the completion of any operation of the machine the detachable accounting device may be released by pushing the key 37 inwardly its full movement.

A cam for automatically lifting the latch 21 at the completion of operations of the machine and when the key 37 is in its normal position, is illustrated in Fig. 4. This cam 41 actuates a pitman 42 which is connected at its lower end (Figs. 2 and 20) to a lever 43 which is pivoted upon the shaft 22 and at its forward end carries a rocking member 44 by a pivot pin 47. A pin 45, which is carried by the latch 21, extends through a slot 46 in the member 44 and which is circular to its pivot 47. The member 44 is shown in its normal position in Figs. 2 and 20 and when in this position the downward movement of the pitman 42 causes the member 44 to lift the latch 21 and thereby release the carriage 1. The member 44 may, however, be rocked forwardly from its pivot 47 bringing a radial off-set part 48 of the slot 46 beneath the pin 45 and when in such position the upward movement of the member 44 does not cause the release of the carriage 1. The member 44 is set in this latter position by drawing the key 37 outwardly so that the shoulder 40 comes above the pin 39 of the latch and positively prevents upward movement of member 44 and thereby the release of the carriage 1. In order that the key 37 may control the angular positioning of member 44, this member is provided with a pin 49 which extends through a slot 50 in the slide 36.

*Differential mechanism.*—When a detachable accounting device is inserted into the machine its denominational blades 51, Fig. 3, engage setting slides or racks 52 (Figs. 2, 6 and 22) which are slidably mounted within the machine. These racks are moved inwardly more or less according to the setting of the denominational blades of the detachable device. If a blade 51 is in its outer or "nine" position it will cause its respective coacting rack 52 to move nine units of movement, whereas if it is in its inner or "zero" position it will not disturb the setting of its respective rack 52 upon the inward movement of the detachable device.

The racks 52 mesh with intermediate pinions 53 (Figs. 6 and 22) each of which is pinned to a slide 54 and meshes with teeth 55 of an actuating slide or rack bar 56. The rack bars 56 are slidably mounted upon a rod 57 and are supported at their rear ends by levers 58 (Figs. 7 and 22) which are pivoted loosely upon a shaft 59. Rearward movement of the rack bars 56 is normally prevented by a rod 60 which extends across the rear edge of the levers 58; therefore when the racks 52 are differentially pushed inwardly they cause the gears 53 to roll rearwardly upon the rack teeth 55 and thereby carry their slides 54 rearwardly more or less depending upon the extent of movement of the setting racks 52. The slides 54 are slidably mounted upon a rod 61 and a shaft 62 as indicated in Figs. 6 and 22, and when moved rearwardly bring their rear edges 63 more or less toward pins 64 which are carried by arms 65 fast on a shaft 66, there being one pin and arm for each slide 54. This shaft is oscillated by a cam 67 (Fig. 9) for the purpose of restoring all of the slides 54 to their zero positions, but before the slides 54 are restored pawls 68 are rocked downwardly into mesh with teeth 69 in the racks 52 thereby locking the racks 52 in their moved positions; then when the slides 54 are restored the gears 53 roll upon teeth of the racks 52 thereby causing the actuating racks 56 to move forwardly extents which correspond to the original inward movement of the racks 52. No means for rocking pawls 68 are shown but it will be understood that this is accomplished by a cam on one of the drive shafts, connected to the pawl supporting shaft, this cam to retain the slides 52 locked from the very beginning until nearly the end of the operation of the machine. The racks 56 are provided with rack teeth 70 which mesh with segment gears 71. The segment gears 71 are loosely journaled on shaft 62 and are secured to segments 72 which carry racks 73 meshing with idle pinions 74 (Fig. 11) which are journaled upon a subtotalizer shaft 75. Subtotalizer pinions 76 (Figs. 6 and 22) are also journaled upon the shaft 75 beside the idle pinions 74 and may be operatively connected with the idle pinions by broad pinions 77, Figs. 11 and 12, which are journaled upon a rod 78 of a frame 79 which is pivotally hung from a shaft 80. The broad pinions are normally out of mesh and during the restoring of the slides 54 remain in this position, therefore the rearward movement of the segments 72 merely cause the idle pinions 74 to be differentially rotated according to the extents of rearward movement of the segments. When the segments 72 are at rest in their moved positions the broad pinions 77 are rocked into mesh with the pairs of pinions 74 and 76 and are held in mesh during the return of the segments 72 to their zero positions and thus cause the differential rotation of the totalizer pinions in exact correspondence with the extents of inward movement of the racks 52. The segments 72 are restored to zero positions by a cam 81 (Figs. 8 and 22) on drive shaft 92. This cam acts upon a roller 83 on a pitman 84 which connects the cam to an arm 85 (Fig. 7) fast on a shaft 86. Shaft 86 carries a pair of arms 87 between which extends a rod 88 passing across the front edge of the lever arms 58. The cam 81 is arranged to rock the rod 88 forwardly when the rack bars 56 are moved forwardly but when these rack bars and the segments 72 are at rest in their moved positions the rod 88 is returned to its original position as shown in Figs. 8, and 22, thereby restoring all of the racks 56 to zero position and through these racks restoring the segments 72.

The next operation which occurs is the unlocking of the denominational slides of the detachable accounting device in the machine. In order to unlock these slides it is necessary to rock a locking plate 93 (Fig. 3) in the detachable device upon its pivot 94 in order to carry a flange 95 of the same out of engagement with the teeth 96 of the denominational slides 51. This plate is provided with a pointed flange 95 for the purpose of locking the slides in their set positions and extends beyond its pivot 94 beneath an opening 246 in the casing of the detachable accounting device. The machine is provided with an arm 247 (Figs. 2 and 20) which is pointed for the purpose of entering the opening 246 and rocking the plate 93 to its unlocking position. The arm 247 is actuated at the desired time by a cam 248 (Fig. 5) which is carried by the drive shaft 92. This cam acts upon a roll 249 on an arm 250 which is carried by a sleeve 251 (Fig. 2) encircling shaft 111. This sleeve carries an arm 252 which is connected by a link 253 with an arm 254 on a shaft 255 which carries the pointed arm 247. Therefore when the lever 250 is rocked downwardly by the cam 248 the lever 247 will be caused to enter the detachable accounting device which is in the machine and unlock the same. As the accumulating blades of the detachable accounting device are now free to move, these blades will not interfere with free movement of the differential mechanism of the machine when under the control of the keyboard. After the setting of the detachable accounting device has been transferred to the totalizer 76 the amount which has been set on the keyboard is either added to or subtracted from the totalizer depending upon which transaction key is depressed.

Amount keys 97 (Fig. 11) of which there may be several banks control the differential movement of a plurality of slides 98 which are actuated by springs 99 but are normally prevented from moving downwardly under the action of these springs by arms 100 fast on a shaft 101. This shaft is permitted to rock at the proper time to carry the arms 100 downwardly by a cam 102 (Fig. 10) which actuates a pitman 103 connected at its upper end to an arm 104 fast on the shaft 101. The slides 98 are cut, as indicated in Fig. 11, to form stops 105. These stops are bent outwardly alternately to the right and left into a vertical plane with similarly extending flanges of the shanks of respective keys. The slides, therefore, move downwardly more or less according to the particular key which is depressed, as the stops 105 are at graduated distances from the keys when the slides 98 are in their normal positions. No zero stops for these slides are shown; but any desired means may be employed to prevent movement of a slide when no key in its bank is depressed. The lowering of the slides 98 causes levers 106 (Fig. 6) to which they are pinned at 120 to rock downwardly from their pivots 107 according to the extent of downward movement of the slides. The levers 106 are connected by links 108 to the corresponding segments 72. At the time of the lowering of the slides 98 the segments 72 are held in their zero positions by the rod 88 (Figs. 7 and 22) which prevents movement of the racks 56 with which the segments 72 mesh. Thus when the slides 98 lower the levers 106 are compelled to rock from their pivots 107; the links 108 at this time rocking slightly from their pivots 109 as will be readily understood.

When the slides 98 are at rest in their lowered position they are locked in these positions by alining pawls 110 (Fig. 11). The pawls 110 are loose upon a shaft 111 and are actuated by cam arms 112 on a shaft 113 which is provided with an arm pivoted to a pitman (not shown in the drawings) which is controlled in its movement by a cam on the drive shaft 82.

The levers 106 carry rolls 117 which extend through V shaped openings 118 in cams 119 which are carried rigidly by the shaft 111. By locking the slides 98 in their set positions and releasing the racks 56 it is possible to transmit the differential movement of the slides 98 to the segments 72 by rocking the levers 106 upwardly from their pivots 120 on the slides 98, an extent which is equal to the extent of downward rocking of the levers 106 from their pivots 107. This is accomplished by rocking the cams 119 into engagement with the rolls 117, thereby causing the rolls to move upward approximately to their original positions but as at this time the slides 98 are locked in their set positions and the racks 56 are free to move, the levers 106 will rock from their pivots 120 thereby causing the segments 72 to be rocked rearwardly the desired extents. If the broad pinions 77 are in mesh at this time the rearward movement of the segments 72 will cause rotation of the totalizer pinions 76 in a subtractive direction. If it is desired to add the amount to the subtotalizer the broad pinions are held out of mesh during the backward rocking of the segments 72 and are meshed with the segments when at rest in their moved positions. The segments are then restored to their zero positions and the broad pinions held in mesh at this time thereby causing the totalizer pinions 76 to be rotated in an additive direction. The frame 79 (Fig. 12) which carries the broad pinions 77 is rocked to carry the broad pinions into and out of mesh at the desired times by cams 121, 122 and 123 (Figs. 12 and 12ᴬ) carried by the drive shaft 92. These cams are differently formed for the purpose of meshing the broad pinions at different times and are splined to the drive shaft so that they will rotate with the same but may be shifted in the direction of the length of the drive shaft to permit bringing a desired cam into operative relation with a roll 124 on an arm 125 fast on the shaft 80. The means for shifting the cams is controlled by the bank of transaction keys as pointed out farther on.

The cams 119 which are carried by the shaft 111 are operated by a cam 126 (Fig. 11) which is carried by the drive shaft 82. This cam causes the reciprocation of a pitman 127 which is connected to an arm 128 fast on the shaft 111. The drive shaft 82 rotates in the direction indicated by arrow 89 and the cam 126 is provided with a race 129 into which extends a roller 130 on the pitman 127, and the periphery of the cam is suitably formed for coacting with a second roller 131 on the pitman 127. The cam by engagement with the roller 130 first causes the forward movement of the pitman thereby forcing the cams 119 into engagement with the rolls 117 and then a shoulder 132 of the cam engages the roller 131 causing the pitman 127 and the cams 119 to return to their original positions.

The bank of transaction keys 31 causes the required shifting of the cams 121, 122 and 123 in the following manner. The transaction keys control the movement of a slide 133 (Fig. 12) which is similar in construction to the slides 98 controlled by the banks of value keys but it is not operatively connected with a segment 72 of the differential mechanism but is connected to a lever 134 which is similar to the levers 106 but is pivoted at its inner end to a link 135 connected to a segment gear 136 which is geared to the transaction indicator. The segment gear 136 is differentially rocked in the manner described for differentially rocking the segments 72 when under the control of the keyboard. The lever 134 carries a roll 137 which in this case coacts with a cam 138 on a shaft 139. This shaft is oscillated at the desired time by a cam which is carried by the drive shaft 82 and is similar to the cam 126 which actuates the cams 119. Rigid with the segment gear 136 is a segment 140 which is provided with shoulders 141 and 142 and notches 143 one of which is brought opposite an extension 144 of a lever 145 when the segment 140 is differentially set. The lever 145 is journaled upon a shaft 146 and is moved upwardly at the proper time into engagement with one of the shoulders 141 or 142, or one of the notches 143 by a spring 147. This spring is normally not compressed and so does not affect the normal position of the lever 145 but is compressed at the desired time by an arm 148 fast on the shaft 146 which is oscillated to actuate this arm by a cam 149 on the drive shaft 82. This cam is provided with a race 150 into which extends a roller 151 on a pitman 152 which is pivoted at its rear end to an arm 153 fast on the shaft 146. It may be seen from Fig. 12 that, depending upon the setting of the segment 140, the extension 144, upon an operation of the machine, will be held either in its normal position or caused to rise one or two steps into engagement with a shoulder 142 or into one of the notches 143. The lever 145 is pivoted at its outer end to a link 154 connected with a bell crank lever 155 (Fig. 23) pivoted to the frame of the machine at 156 and provided with a downwardly extending fork 157 which extends into an annular groove of a collar 159 which is rigid with the cams 121, 122 and 123. If the arm 145 remains in its normal position cam 121 will remain in coacting relation with the roll 124 of arm 125. With this cam in coacting relation with the roll 124 (Fig. 22) the broad pinions 77 will be held in mesh at the time of the first return of the segment gears 72 when transmitting the differential setting of a detachable accounting device to the subtotalizer, and will be held out of mesh at the time the segment gears 72 are under the control of the keyboard, but will again be held in mesh toward the latter part of the operation of the machine at which time the subtotalizer is reset and its setting is transmitted to the detachable accounting device as will be described farther on. This cam causes the required meshing of the broad pinions 77 when a registration is made in which it is not desired to alter the setting of the detachable accounting device which is in the machine, but which it is desired to record in other accounting devices of the machine, such as the printer. The racks 56, Figs. 7 and 22, are connected to shafts 160 by studs 162, which project from arms 161, secured to the shafts, into slots formed into said racks 56. The shafts 160 are suitably connected to type carriers 163 by mechanism not herein shown but fully shown and described in the application heretofore referred to. It will be readily understood that the relative location of shoulders 141 and 142 and notches 143 depends on the insignia on the transaction keys, and the locations herein shown are illustrative merely. A complete disclosure of a theory by which such locations may be assigned is found in said copending application but each case would be determined by the classes of transactions handled.

If the segment 140 (Fig. 12) is set so that the lever 145 engages either a shoulder 142 or enters one of the notches 143 either the adding cam 122 (Fig. 24) or the subtracting cam 123 (Fig. 25) will be brought to operative relation with the roll 124. The adding cam causes the broad pinions to be held in mesh upon the first return of the segments 72 when an amount is transmitted from a detachable accounting device to the subtotalizer and again in mesh upon the second return of the segments 72 when an amount is added to the subtotalizer as determined by the keyboard, and remaining in mesh until a third rearward movement of the segments 72 when the subtotalizer is reset for the purpose of transmitting its final setting to detachable accounting devices.

If the subtracting cam 123 is in operative relation with the roll 124 the broad pinions will be held in mesh during the first return of the segments 72 when the setting of a detachable accounting device is transmitted to the subtotalizer. After the first return of the segments 72 the broad pinions are permitted to remain in mesh so that upon the second rearward movement of the segments 72 when under the control of the keyboard, the subtotalizer pinions 76 will be rotated in a subtractive direction. The broad pinions are then rocked out of mesh so that the second return of the segments 72 will not effect the setting of the subtotalizer. The broad pinions are then again rocked into mesh when the segments are at rest in their forward positions so that upon the resetting of the subtotalizer their differential movement may be transmitted to the detachable accounting device. The cams 121, 122 and 123 are cut away slightly at their shallow parts 294 to allow clearance between the cams and the roll 124 at the time of shifting the cams.

The subtotalizer pinions 76 and the idlers 74 are alined when out of mesh with the broad pinions by alining pawls 295 (Fig. 11) which are pivoted upon the shaft 78 and also to hooks 296 which connect the pawls with the shaft 75 so that when the broad pinions are rocked into mesh these hooks will force the pawls out of mesh and vice versa.

*Transfer mechanism.*—Transfer devices are not necessary for the subtotalizer when amounts are transmitted from the detachable accounting devices to the subtotalizer and when amounts are transferred from the subtotalizer to the detachable accounting device, but when the subtotalizer is being rotated either in an additive or subtractive direction when a registration is made from the keyboard it is sometimes necessary to effect transfers as the totalizer pinions may at this time pass from their nine position to their zero position or from their zero position to their nine position.

A novel transfer mechanism is provided by which it is possible to cause the racks 73, which are carried by the segments 72, to move relatively to their carrying segments either in an additive or subtractive direction and at the exact moment at which a transfer becomes necessary. The specific construction of the transfer mechanism is as follows: The racks 73 (Figs. 6, 21 and 22) are carried by pins 164 on the segments 72 which extend through slots 165 circular to the pivotal center of the segments. These slots extend both to the right and to the left of the pins but the racks 73 are normally prevented from movement relatively to the segments 72 by dogs 166 which are pivoted upon the segments 72 and carry pins 167 which normally engage shoulders 168 of racks 73 and therefore prevent movement of the racks 73 in either direction relatively to the carrying segments 72. The dogs 166 are held in engaging position by springs 169 which extend between downwardly extending hooks of the dogs. Each pair of dogs 166 may be rocked out of engagement with their shoulder 168 by a bar 170 (Fig. 3) which is circular to the shaft 62 and slidably mounted upon the pins 164 so that it may be moved toward the shaft 62 and thereby engage shoulders 171 of the dogs 166, rocking the dogs out of engagement with the shoulder 168. The bars 170 are moved downwardly for this purpose by pawls 172 (Figs. 6) which are pivoted upon a shaft 173 and are provided with noses 174 coacting with pins 175 which are carried by the totalizer pinions 76. One of these pins engages a pawl 172 whenever its respective totalizer pinion passes from nine to zero or from zero to nine. Means are provided which, upon transferring operations, compel each rack 73 to move an extra unit under spring action in an additive direction if its respective segment 72 is moving in an additive direction and to compel the extra unit of movement of the rack 73 in a subtractive direction when its respective segment 72 is moving in a subtractive direction. To accomplish this members 176 are pivoted upon the segments 72 by pins 177 and extended into slots 178 of their respective racks 73 as indicated in Fig. 6.

Each member 176 is provided with a curved edge 179 which is engaged by a roller 180 carried by a rod 181 forked over a pin 182 on the segment 72 so that the rod 181 can move in a longitudinal direction relatively to its respective segment. A spring 183 normally urges each rod 181 into engagement with the member 176 and would compel said member to rock upon its pivot when the roller 180 is at one side or the other of a center line passing through the pin 182 and pin 177 of the member, if it were not for the dogs 166 which prevent movement of the rack 73. Means are provided for causing the roller 180 to be below the center line passing through these pivots whenever the segments 72 are moved in a rearward or subtractive direction and for causing the roller 180 to be above the center line whenever the segments 72 are moved in an additive direction. If a transfer occurs and the dogs 166 are rocked out of engagement when the roller 180 is below the center line, the rack 73 will be moved an extra unit as limited by the length of the slots 165 in a subtractive direction, forced by the member 176. If a transfer occurs when the roller 180 is above the center line referred to, the rack 73 is, of course, compelled to move an extra unit relatively to its carrying segment 72 in an additive direction. The means for shifting the rollers 180 as necessary is illustrated in Figs. 6 and 13. Each roller is connected by a link 184 to an arm 185 fast on a shaft 186. This shaft carries an arm 187 (Fig. 13) which is connected by a pitman 188 to a lever 189 pivoted to one of the machine frames at 190 and provided with a roll 191 coacting with a cam 192 upon the drive shaft 82 and connected by a link 193 to an arm 194 which is pivoted at 195 and carries a roll 196 for coacting with a cam 197 on drive shaft 92. When the cam 192 engages the roll 191 the arms 185 are all rocked upwardly and, therefore, the rollers 180 come to their proper position for adding operations and when the cam 197 engages the roller 196 the arms 185 are rocked downwardly, thereby bringing the rollers 180 to proper position for subtracting operations. There is a lost motion connection 198 between the arms 185 and the links 184 to permit free movement of the members 176 at the time of transferring. It will be clear from the drawings that cams 197 and 192 are timed to move rollers 180 below the center of members 176 when the segments are moving in a subtracting direction and above the center when the segments are oppositely moved. This mechanism provides an automatic resetting device for the transfer racks.

The final operation of the subtotalizer is its resetting while in mesh with the racks 73 thereby transmitting its setting through the differential mechanism to the detachable accounting device which is in the machine. No matter which of the cams 121, 122 or 123 is in operative relation with the broad pinions 77 the broad pinions will be held in mesh with the totalizer pinions 76 and the idlers 74 at the time of resetting the totalizer. The totalizer is reset by first shifting the totalizer shaft 75 (Figs. 6 and 15) in a longitudinal direction so that notches 256 in the totalizer shaft come into a vertical plane with pawls 257 which are pivoted to the totalizer pinions. The shaft 75 is then caused to make a half rotation in the direction indicated by arrow 258 (Fig. 6), the notches at this time engaging the pawls when arriving opposite tongues 259 of the pawls and through these pawls causing the totalizer pinions to be returned to their zero positions.

The totalizer shaft is caused to make this half rotation at the time of resetting by a cam 260 (Fig. 14) which is carried by the drive shaft 82 and causes the reciprocation of a pitman 261 pinned at its lower end to a segment gear 262 which is pivoted at 263 and meshes with a pinion 264 splined to the shaft 75. The pinion 264 is prevented from moving with the shaft when the shaft is shifted in the direction of its length by a bracket 265 (Fig. 15) which is carried by side frame 266. Upon resetting operations the shaft 75 is given its half rotation upon the down stroke of pitman 261. The pitman 261 is restored to its upper position upon the beginning of rotation of the drive shafts while the notches 256 in the totalizer shaft are not in operative relation with the pawls 257 and because of this a half rotation of the shaft 75 upon the restoring of the pitman does not affect the setting of the totalizer pinions.

The shifting of shaft 75 is accomplished by cam 277 (Fig. 15) which is provided with a suitable race 278 in its periphery for causing the rocking of a lever 279 which extends into the cam race and is pivoted at 280 and connected to the shaft 75 by pins 281 which extend into a groove in a collar 282 fast on the shaft.

When the pinions are backwardly rotated to their zero positions the segments 72 are caused to rock backwardly a corresponding extent and, therefore, shift the actuating racks 56 forwardly. These racks through the pinions 53 transmit the differential movement of the segments 72 to the actuating racks 52 causing these racks to move rearwardly. As the denominational slides of the detachable accounting device are at this time unlocked the slides follow the racks 52 under the action of their springs 283 (Fig. 3). After the denominational blades 51 are thus set as desired the pointed arm 247 is withdrawn from the detachable accounting device permitting the plate 93 to lock the denominational slides in their set positions. The detachable device is then ejected from the machine as previously explained and the broad pinions 77 are rocked out of mesh, whereupon the differential mechanism is automatically restored to its initial position by springs 284 (Fig. 6).

*Printing mechanism.*—The printing mechanism is illustrated in Figs. 16 to 19 inclusive. The printer is adapted to issue printed checks giving detailed information in regard to each transaction which is recorded. A platen for printing the check is indicated at 200 (Fig. 16). The printer is also arranged for printing the same matter upon an inserted sales slip if desired. The platen 201 is for printing upon inserted sales slips. The operating mechanism of the printer is not detailed in the drawings as it is similar in principle of operation to the operating mechanism of one of the printing devices described in the before mentioned patent application. Check paper 202 is fed by means of rolls 203, 204, 205, and 206 suitably geared to one of the drive shafts. The rolls 204 and 205 are printing cylinders such as illustrated in Figs. 17 and 18. Each roll is provided with a flange 207 extending part way around its circumference and coacting with one of the feed rolls 203 or 206 for the purpose of feeding the check paper only during part of the rotation of the rolls 204 and 205. Each printing cylinder carries an auxiliary cylinder 208 provided with nine printing surfaces 209, and shafts 210 supporting the cylinders 208 each carrying a toothed wheel 211 (Fig. 16). Pawls 212 are arranged near the printing cylinders in the same vertical plane as the wheels 211 so that upon each rotation of one of the cylinders 204 or 205 the respective auxiliary cylinders 208 will be caused to make one-ninth of a rotation by one of the teeth of the wheels 211 engaging one of the pawls 212. The cylinders 208 may be provided with different lines of advertising matter and, therefore, the advertising matter on the checks issued by the machine will be altered upon successive operations. The printing cylinders 208 are alined in their set positions and prevented from accidental rotation by spring pressed plungers 290 which coact with polygonal plates 291.

It will be seen that the printing devices are set to three printing positions at each operation, and it is a matter of choice how many and what impressions are taken. The platen cams are easily designed to accomplish any desired purpose, and are shown in said prior application as taking three impressions.

Fig. 19 illustrates the ink ribbon feeding and reversing mechanism. This mechanism includes a pair of cylinders 213 and 214 carrying an ink ribbon 215 leading from one cylinder to the other. It receives power from an oscillatory bell crank lever 292 which carries a pin 293 extending through a fork in a plate 220. The cam and pitman for oscillating the bell crank lever 292 are omitted from the drawings. The cylinders are rigid with ratchets 216 and 217 which are adapted to be engaged by pawls 218 and 219 carried by the plate 220. The device is arranged so that only one of the pawls engages its respective ratchet at a time upon the reciprocation of the plate 220. The plate 220 supports a plate 221 by pins 222 extending from the plate 220 through slots 223 in the plate 221. The plate 221 through friction with the pins 222 normally reciprocates with the plate 220, but movement of the plate 221 may be prevented for the purpose of shifting this plate relatively to the plate 220, and by this relative shifting between the plate 220 and the plate 221 the position of the pawls 218 and 219 is reversed and thus the direction of feed of the ink ribbon is reversed. The relative movement between the plate 220 and plate 221 is controlled by levers 224 and 225 pivoted by pins 228 to plate 221 and provided with rolls 226 which are held into engagement with the rolls of ink ribbon by springs 227. The levers 224 and 225 extend inwardly from their pivots 228 so that when one of the spools of ink ribbon is nearly unwound such inward extension will come into a horizontal plane with a pin 229 extending from a side frame of the machine; then upon the reciprocation of the plate 220 such extension engages the pin 229 preventing a full movement of the plate 221 which is, therefore, shifted relatively of the plate 220. The plate 221 carries a pair of rolls 230 and 231 which extend across the upper inner edges of the pawls 218 and 219 and upon the relative movement between the plates one of these rolls engages a shoulder 232 on one of the pawls, rocking the pawl out of engagement with its respective ratchet and the other roll passes out of engament with the shoulder of its respective pawl, thereby permitting its pawl to drop into engagement with its ratchet under the action of a spring 233. By the above means the direction of feed of the ink ribbon is reversed, and it will be noted that this reversal is positively effected without strain on the ribbon.

The inner flanges of the spools which carry the ink ribbon are engaged by the rolls 226 which thereby retain the spools under their shafts 234 and 235. In order to remove the ink ribbon spools the rolls 226 are lifted by a handle 236 on a shaft 237, which is carried by the machine frame. By rocking handle 236 downwardly a slide 238 is caused to move downwardly, as this slide is connected to handle 236 by a pin 239 and an arm 240 on the shaft 237. The slide 238 is carried by pins 241 on the plate 220 which pins extend through slots 242 in the slide. Flanges 243 on slide 238 extend over the inner extensions of the levers 224 and 225 and, therefore, rock these levers clear of the ink ribbon spools upon the downward movement of the handle 236, thus permitting removal of the ink ribbon spools.

The machine in general is shown as particularly adapted for use with the detachable accounting or accumulating devices described, but it will be obvious that many of the features disclosed are well adapted for cash register machines which do not include such detachable devices. For example, the mechanism shown in Fig. 6 whereby the slides 52 control, through the intermediate mechanism, the addition of amounts to the subtotalizer, is susceptible of uses not involving the detachable accumulator. So, too, the mechanism shown in Fig. 12 for controlling the subtotalizer is not in any way necessarily connected with the detachable devices and may be employed in an adding and subtracting machine. Therefore a number of the claims employ the word "totalizer" and it is intended that this word shall cover a device having other capabilities than that of the precise functions shown, so also other terms in the claims are intended to indicate the possibility of use of the constructions claimed apart from the detachable accumulating devices.

While the forms of mechanism here shown and described are admirably adapted to fulfil the objects primarily stated, it is to be understood that I do not care to confine myself to any one form of embodiment of the invention here disclosed, for it is susceptible of embodiment in various forms all coming within the scope of the claims which follow.

What is claimed is:

1. In a machine of the class described, the combination with a detachable accumulating device manually insertible in the machine, of setting slides in the machine differentially adjusted by said detachable device when the same is inserted, actuating slides in the machine, segment racks actuated by said actuating slides, intermediate gears connecting said setting and said actuating slides, with means for operating said gears and a subtotalizer operated by said segment racks.

2. In a machine of the class described, the combination with a detachable accumulating device manually insertible in the machine, of setting slides in the machine differentially adjusted by the insertion of said detachable device, actuating slides in the machine, intermediate positive connections between said setting and said actuating slides, means for resetting said intermediate connections and thereby operating said actuating slides, a sub-totalizer, having connections from said actuating slides to drive the same, and key controlled mechanism constructed to drive further said sub-totalizer connections.

3. In a machine of the class described, the combination with a sub-totalizer, and segment racks for actuating the same, of banks of keys, and slides differentially positioned thereby, levers connected to said slides and to said segment racks, cams for moving a point of each lever to a substantially constant position, and means for resetting said racks and said slides.

4. In a machine of the class described, the combination with a detachable accumulating device manually insertible in the machine, of a sub-totalizer, segments for actuating said totalizer, connections whereby said segments are positioned differentially under control of said detachable device, banks of keys, key controlled slides, levers connecting said slides to said actuating segments, and means for bringing a point of each lever to a substantially constant position at each operation of the machine and thereby further moving said actuating segments.

5. In a machine of the class described, the combination with a sub-totalizer, of driving segments therefor, actuating racks slidably mounted on said segments, pawls carried on said segments and normally preventing movement of said racks in opposite directions, pivoted members connected to said racks, spring impelled bars engaging said pivoted members, means for moving said bars past the center of said pivoted members, and connections from said totalizer for displacing said pawls.

6. In a machine of the class described, the combination with a transaction determining element differentially adjustable, of a graduated stop having connections whereby its movement is determined by said element, an arm, with means for yieldingly forcing said arm against said graduated stop, a plurality of differently timed cams having connections to be shifted by said arm, a sub-totalizer and actuating racks therefor, and a lever controlled by said cams for connecting said totalizer to its actuating racks.

7. In a machine of the class described, the combination with a detachable accumulating device, and a carriage mounted to slide into the machine and on which said detachable device may be manually placed, of a latch positioned to hold said carriage when the same has been inserted in the machine, and having a roller, a slide bearing a push key and having a cam edge positioned to engage said latch roller and thereby release said latch, and a lever having connections to also release said latch by an operation of the machine.

8. In a machine of the class described, the combination with a detachable accumulating device, and a carriage mounted to slide into the machine and on which said detachable device may be manually placed, of a latch for said detachable device, mounted on said carriage, and having a rearward extension, a transaction key, and a hook connected normally to prevent actuation of said transaction key, with connections in the path of said latch extension when the detachable device is latched, for displacing said hook, as the carriage moves into the machine.

9. In a machine of the class described, the combination with a detachable accumulating device manually insertible in the machine, of setting slides adjusted differentially by such insertion, additional slides in the machine, gears permanently connecting said setting and said additional slides, segments geared to said additional slides, a totalizer driven by said segments, means for bodily moving said connecting gears, thereby adjusting said segments, and means for restoring said segments to normal zero positions.

10. In a machine of the class described, the combination with a detachable accumulating device manually insertible in the machine, of setting elements differentially positioned by contact with said accumulating device, additional setting elements in the machine, gears permanently connecting said setting elements to said elements, means for bodily moving said gears to a constant position, and a totalizer driven from said additional elements.

11. In a machine of the class described, the combination with setting elements constructed to be given differential adjustments, additional setting elements, gears bodily movable by said setting elements and permanently connecting said setting elements to said additional elements, means for restoring said gears to constant positions, a totalizer, and connections from said additional elements to actuate said totalizer.

12. In a machine of the class described, the combination with setting elements constructed to be given differential adjustments, of additional setting elements, gears bodily movable by said setting elements and permanently connecting said setting elements to said additional elements, devices for restoring said gears to constant normal positions, a totalizer, and connections from said additional elements for actuating said totalizer, with devices for restoring said additional elements and totalizer connections to normal zero positions.

13. In a machine of the class described, the combination with setting elements constructed to be given differential movements, of means for locking said elements in their differential positions, additional setting elements, devices permanently connecting said setting elements to said additional elements, means acting on corresponding points of said connecting devices and returning said points to constant normal positions, thereby differentially adjusting said additional elements, a totalizer driven from said additional elements, and means for restoring said additional elements to normal zero positions and thereby driving said totalizer.

14. In a machine of the class described, the combination with a bank of keys, and a slide differentially set under control of said keys, of a totalizer element and means for actuating it, a permanent connection from said slide to said totalizer actuating means, devices for returning a point of said connection to a substantially constant position, and means for restoring said totalizer actuating means to normal zero position.

15. In a machine of the class described, the combination with a bank of keys and an element differentially spring set under control of said keys, of a totalizer element and means for actuating it, a permanent connection from said spring set element to said totalizer actuating element, a cam movable to restore a point of said permanent connection to a substantially constant position, and thereby actuate said totalizer actuating element, and means for restoring said actuating element to normal zero position.

16. In a machine of the class described, the combination with a bank of keys, and an element differentially set under control of said keys, of a totalizer element and an actuating rack therefor, a lever permanently connecting said differentially set element to said actuating rack, and bearing a projecting pin, a cam acting on said pin and returning it to a substantially constant position, and means for returning said totalizer actuating rack to its normal zero position.

17. In a machine of the class described, the combination with a totalizer and actuating devices therefor, with means for connecting said totalizer to said actuating devices, of a main operating mechanism having connections to move said actuating devices differentially away from and back to their normal positions, cams driven from said main operating mechanism, differently timed, and causing said connecting means to connect said totalizer to its actuating devices during either movement of said actuating devices, and means for moving said cams into and out of operative position.

18. In a machine of the class described, the combination with a totalizer, and actuating devices therefor constructed to add and to subtract amounts from said totalizer, of transaction determining keys, an element having graduations, and means for setting said element under control of said keys, devices constructed to determine whether movement of said actuating devices shall cause addition to or subtraction from said totalizer, and means, controlled by said graduations, for actuating said determining devices.

19. In a machine of the class described, the combination with a totalizer and actuating devices therefor, with means for connecting said totalizer to said actuating devices, of a main operating mechanism having connections to move said actuating devices differentially away from and back to their normal positions, cams driven from said main operating mechanism, differently timed, and causing said connecting means to connect said totalizer to its actuating devices during either movement of said actuating devices, and means for bodily moving said cams so that the desired cam is brought into operative relationship with said connecting means to actuate the latter.

20. In a machine of the class described, the combination with a totalizer and actuating devices therefor, with means for connecting said totalizer to said actuating devices, of a main operating mechanism having connections to move said actuating devices differentially away from and back to their normal positions, cams driven from said main operating mechanism, differently timed, and causing said connecting means to connect said totalizer to its actuating devices during either movement of said actuating devices, and differentially movable means for moving the cams to bring the desired one into position to actuate the connecting means.

21. In a machine of the class described, the combination with a totalizer, of driving segments therefor, actuating racks mounted on said segments and capable of being moved one unit in an additive or subtractive direction, means normally preventing movement of said racks, connections from said totalizer for displacing said means, pivoted members connected to said racks, spring impelled rods engaging said pivoted members, and means for moving said rods past the center of said pivoted members.

22. In a machine of the class described, the combination with a totalizer; of driving segments therefor; actuating racks slidably mounted on said segments; connections from said segments normally preventing movement of said racks in opposite directions; slidable plates on said segments; connections between said plates and said totalizer whereby said connections preventing movement of said racks are displaced; members pivoted to said segments and connected to said racks; and means for rocking said members to either side of their normal position whereby said racks are moved one unit in an additive or subtractive sense.

23. In a machine of the class described, the combination with a totalizer; of driving elements therefor; actuating racks for the totalizer slidably mounted upon the driving elements; means movable with said driving elements and normally holding the racks against movement relative to their driving elements; pivoted members coöperating with the racks; rods yieldingly mounted on said driving elements and in permanent operative relationship with said pivoted members; and operative devices for rocking said rods to either side of normal position, whereby said actuating racks are given an additional unit of movement when said holding means are rendered ineffective.

27. In a machine of the class described, the combination with a subtotalizer; and segment racks for actuating the same; transaction keys and a slide differentially positioned thereby; a graduated element; a lever connecting said slide and said element; cams for moving a point on said lever to a substantially constant position; an arm provided with means for yieldingly forcing said arm against said graduated element; a plurality of differently timed cams having connections to be shifted by said arms; and a lever controlled by said cams for connecting said totalizer to its actuating racks.

25. In a machine of the class described, the combination with a detachable accumulating device; of a carriage mounted to slide into the machine and on which said detachable device may be manually placed; a latch positioned to hold said carriage when the same has been inserted into the machine; a projection on said latch; a manually movable slide; means on said slide positioned to engage said projection on said latch when the slide is moved in one direction thereby locking said latch from movement; operative means for normally releasing said latch from said carriage at the end of the operation of the machine; and connections between said operative means and said slide whereby said operative means is rendered inoperative when said slide is moved to lock said latch from movement.

26. In a machine of the class described, the combination with a detachable accumulating device; of a carriage mounted to slide into the machine and on which said detachable device may be manually placed; a latch positioned to hold said carriage when the same has been inserted in the machine; a projection on said latch; a manually movable slide; a hook on said slide whereby said latch is locked from movement by its engagement with said projection when said slide is moved in one direction; a plate having a radial slot and a circular slot having a radial set-off portion; means moving the plate at each operation of the machine; a pin on said slide engaging in the radial slot so that the plate may be positioned by the slide; and a pin on said latch engaging in said circular slot so that the plate may release the latch, said pin being moved into the radial set-off in said circular slot when said slide is moved to lock said latch thus rendering operation of the plate by its operable means ineffective to move the latch.

27. In a machine of the class described, the combination with a detachable accumulating device; of a carriage mounted to slide into the machine and on which said detachable device may be manually placed; a latch positioned to hold said carriage when the same has been inserted in the machine, and having a projection; a manually movable slide having a cam edge positioned to engage said latch projection, when said slide is moved in one direction, thereby releasing said latch; and means on said slide positioned to engage the latch projection when said slide is moved in the opposite direction, whereby said latch is prevented from being released.

28. In a machine of the class described, the combination with a detachable accumulating device; and a carriage mounted to slide into the machine, and on which said detachable device may be manually placed; a latch positioned to hold said carriage when the same has been inserted in the machine; a manually movable slide; connections between said latch and said slide, whereby upon operation of the slide said latch is released; notches in said slide; transaction keys; an arm; and connections between said arm and said keys, whereby said arm is brought into operative relationship with said notches thereby locking said slide from movement during the operation of the machine.

29. In a machine of the class described, the combination of record material; a feeding roll; a type support mounted on a shaft carried in said feeding roll and provided with a plurality of longitudinal rows of relatively stationary type; a ratchet mounted on said shaft; a pin on said feeding roll; and connections from said ratchet to said pin whereby said type support is moved one step upon each rotation of the feeding roll so that printing impressions from different rows of type carriers occur upon consecutive operation of the machine.

30. In a machine of the class described, the combination of a movable member provided with a plurality of longitudinal rows of relatively stationary type with means for feeding the movable member at each operation of the machine so that printing impressions from different rows of type occur upon consecutive operations of the machine.

In testimony whereof I affix my signature in the presence of two witnesses.

EDMUND S. CHURCH.

Witnesses:
A. E. Roor,
Geo. T. Clithero.